Feb. 11, 1936. W. L. REINHARDT 2,030,717
STORAGE BATTERY
Original Filed March 9, 1933
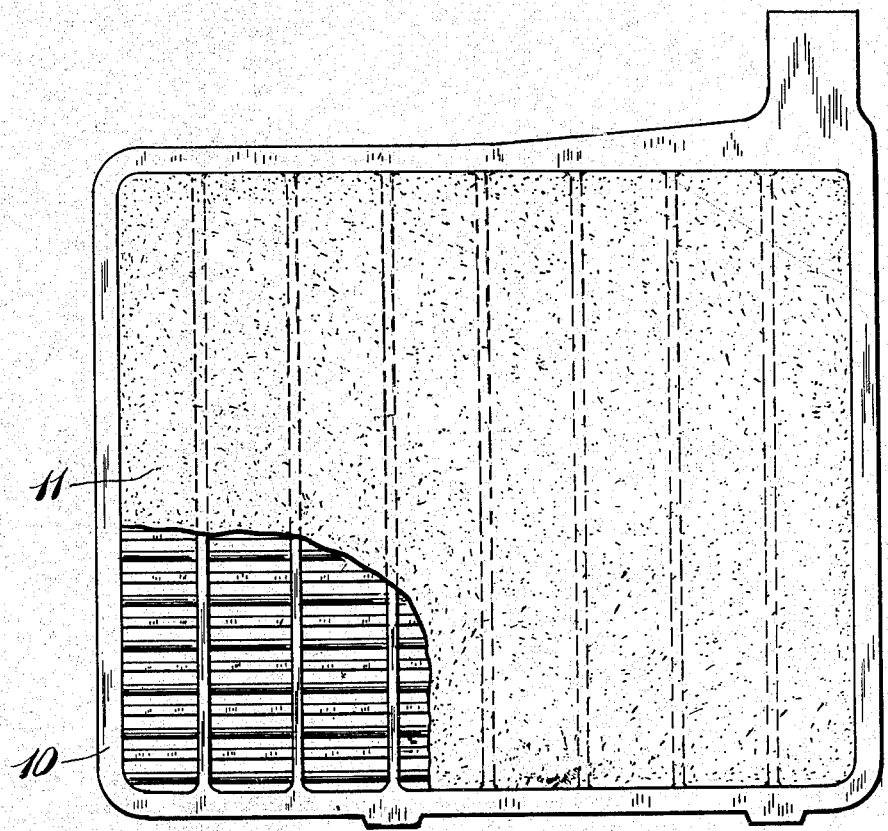
INVENTOR:
WILLARD L. REINHARDT
Kwis Hudson & Kent
ATTORNEYS Patented Feb. 11, 1936

2,030,717

UNITED STATES PATENT OFFICE 2,030,717

STORAGE BATTERY

Willard L. Reinhardt, Shaker Heights, Ohio, assignor to Willard Storage Battery Company, Cleveland, Ohio, a corporation of West Virginia Original application March 9, 1933, Serial No. 660,116. Divided and this application September 20, 1933, Serial No. 690,217

7 Claims. (Cl. 136—26)

This invention relates to storage batteries of the lead-acid type, and especially to the method of making the plates of such batteries, particularly the negative plates. This application is a continuation in part of my application Serial No. 291,139, filed July 7, 1928, and a division of my application Serial No. 660,116, filed March 9, 1933.

Ordinarily, the negative plate is made by applying to a framework or grid of antimony lead a paste containing one or more lead oxides which later in the forming or charging operation are converted electrolytically into spongy lead. This spongy lead is metallic lead in very finely divided condition and forms the active material of the negative plate.

It is common practice to combine with the lead oxide or oxides used in forming the paste for the negative plate an inert material which performs the function of separating the small particles of finely divided metallic lead, thus preventing them from adhering together and forming larger particles. If this inert material, which is commonly called "expander", is not present, relatively large particles of metallic lead will be formed and the active surface of the active material will be reduced, and this will lessen the capacity and reduce the effective life of the negative plate.

Many inert materials have been used for expanders in forming the paste for negative plates, such, for example, as barytes, blanc fixe, silica, carbon black, lampblack, graphite, etc. These materials employed as expanders are practically insoluble in sulphuric acid used in making the paste and in the sulphuric acid of the electrolyte of the finished battery.

In U. S. Patent No. 1,817,846, issued in my name, there is described and claimed an important improvement in expanders which consists in the discovery of a new expander composed chiefly of or containing humic acid. Humic acid, in addition to having the properties of other expanders as described above, also has certain other distinct advantages one of which is that it increases the capacity and life of the negative pole plate. This additional capacity produced by humic acid is more pronounced when the battery is discharged at temperatures below normal than at normal or higher temperatures. While good results are obtained by the use of humic acid in the manner related in the above patent, I find that the best results are obtained by using with the humic acid another expander such as one of those previously used.

One of the objects of the present invention is to provide a suitable combination of expanders in the paste or active material and the desired proportion of the expanders.

The single figure of the drawing is a conventional representation of a battery plate.

In carrying out the invention, for one of the expanders I prefer to employ humic acid because of the fact that it increases the life and capacity of the negative plate, as explained above. Humic acid may be accompanied by one or more other substances the number and nature of which depend on the source or the manner in which the humic acid is produced. For example, it is possible to employ either artificial or natural humic substances. An example of an artificial substance is humic acid made by the action of sulphuric acid on certain carbohydrates. It can be produced in other ways with one or all of which the humic acid may have associated with it somewhat analogous acids, such as ulmic, aprocrinic and crenic acids, which may in themselves have a beneficial effect in the active material, but with the humic acid predominating or constituting the chief ingredient. Examples of natural humic substances are peat and brown coal each of which I believe is composed chiefly of humic acid. Therefore, in view of the fact that humic acid may be accompanied by other materials, when the term "humic substance" is used, I mean humic acid alone or humic acid associated with one or more other substances with the humic acid preferably predominating.

For the other expander which is to be used with the humic substance, several may be employed. I prefer to use barium sulphate although sulphates of other alkaline earth metals, such as calcium or strontium, may be employed, and doubtless still others are available, but a sulphate of one of the alkaline earth metals, such as barium, is employed not only because it serves well in the lead material as an expander, but because it can be applied along with the humic substance by the precipitation process, as will next be explained.

While it is not essential to this invention that the expanders be applied in the manner next to be explained, I have discovered that, if the two expanders can be precipitated in the lead compound, and particularly if they can be simultaneously precipitated from a single solution, they would be uniformly distributed and would be in very fine condition, as is desirable to obtain the best results. I made the discovery that this is possible, and that they can both be precipitated from a single solution, as will now be explained. I might say at this point that it is immaterial whether the expanders which are in solution and which are to be precipitated in the lead compound are chemically combined, as for example as a humate of one of the alkaline earth metals, or whether they are in solution uncombined, as will be explained below. It is obvious, therefore, that I may proceed in different ways and with different materials, but very good results have been obtained by proceeding as follows:

By treating the humic substance with a suitable solution of an alkaline earth metal, I obtain a solution containing the metal which I believe to be combined with the humic acid as a humate. For example, I may treat the humic substance with a solution of barium hydroxide and obtain what I believe to be barium humate. This barium humate solution is then incorporated in the paste or active material in any one of several ways hereinafter described, and then by treating the lead material to which the humate has been applied with a suitable reagent, such as sulphuric acid, the two expanders, barium sulphate and humic acid, are simultaneously precipitated, both these substances being insoluble in sulphuric acid. It will be understood, of course, that instead of forming and utilizing for this purpose barium humate, I may form and utilize a humate of other alkaline earth metals, such as those mentioned above.

As stated above, I do not regard it necessary that the solution consist of a humate or of a solution wherein the metal and the humic acid are chemically combined. For example, the artificial or natural humic substance may be dissolved in an alkaline solution and one of the alkaline earth metals, such as barium, calcium, or strontium, may be added to the same solution as a hydroxide. Whether the dissolved humic substance and the hydroxide of the alkaline earth metal remain as such in solution or whether they combine to form a humate is immaterial to the invention. The remainder of the process is the same whether the solution is obtained in any of the ways above stated, i. e., whether the materials are combined or uncombined.

As before stated, when the solution from which the two expanders are to be precipitated is prepared, I may proceed in different ways. I may form the paste by mixing with the lead oxide or oxides the solution from which the expanders are to be later precipitated, and after the solution has been thoroughly mixed with the oxide or oxides, the expanders may be precipitated in the paste by adding and thoroughly mixing with the paste a mineral acid, such as sulphuric acid. A part of the sulphuric acid will react with the solution which, for convenience, will be assumed to be barium humate, forming barium sulphate and humic acid, both of which are precipitated in very finely divided form uniformly throughout the paste. Likewise, if the materials are not combined, the sulphuric acid will react with the hydroxide of the alkaline earth metal forming a sulphate of the metal, and will at the same time precipitate humic acid since the latter is insoluble in sulphuric acid. In the latter case, as in the former, the two expanders are precipitated in finely divided condition and uniformly throughout the paste.

It is unnecessary that the sulphuric acid or other reagent which causes precipitation be added to the paste formed by mixing the lead oxide or oxides with the solution from which the expanders are to be precipitated, but the solution alone may be used with the oxide or oxides to make the paste, and after the mix has been made and the plates have been pasted, the plates may be dipped into a solution of a precipitating reagent, such as sulphuric acid, long enough for the reagent to permeate the paste and cause the precipitation of the two expanders, or the plates thus pasted may be dried without dipping and may then be formed or charged in the usual manner in an electrolyte of sulphuric acid which converts the paste of the negative pole plates into active material or spongy lead. In this operation, the same results are obtained as before. Or the paste may be made without using the solution and later either the pasted plates or the formed or charged plates may be dipped into the solution until it thoroughly permeates the same, and then into sulphuric acid to cause the precipitation of the two expanders, as before. However, I prefer to cause the precipitation of the two expanders by bringing together in the paste before it is applied to the grids the solution and the sulphuric acid, so as to bring about the precipitation of the two expanders uniformly in the paste rather than by causing the precipitation in either the pasted or the formed plates.

It is of course possible to vary the amount of humic acid or substance and the other expander which are thus introduced into the paste or active material by varying the concentration of the humate in solution which is incorporated in the paste or active material or the concentration of the solutions which are mixed as explained above. It is possible also to vary the ratio of the two expanders for, in making up the solution, it is possible to employ an excess of one or the other of the compounds used in making the solution.

I prefer that the amount of each of the expanders incorporated in the paste or active material in the manner above explained vary from about 0.1% to about 1% by weight. In the case of the humic substance, I prefer that the humic acid content thereof be within the range stated. I might say that while about equal amounts of the two expanders may in some instances be employed, generally such will not be the case. I may maintain the amount of one expander constant and vary the amount of the other. For example, the amount of humic acid that is employed will generally depend upon the conditions under which the battery is used. Usually the plates of batteries which are discharged at lower temperatures are provided with a greater percentage of humic acid.

It is obvious that instead of precipitating the expanders in the paste or active material, they may be added to the oxide or oxides when the paste is being made up, i. e., at the time the expander is usually added.

I might add that the expanders are inert, i. e., they have no deleterious effect on the battery, and, as they are practically insoluble in sulphuric acid, they will remain in the plates and function therein throughout the life of the battery.

Above I have described my invention as applied to the production of negative plates. It may also be used in the production of positive plates, that is to say, it may be used in the production of both the positive and the negative plates, but I now believe it will be sufficient if the expanders are incorporated in the negative plates.

In the drawing I have shown conventionally a typical storage battery plate composed of a grid 10, formed of lead or antimony lead, and the paste or active material 11 which contains two expanders which may be incorporated in the paste or active material in any of the ways above mentioned.

By the conjoint use of two expanders in the active material, such as a humic substance and one of the other expanders such as commonly employed or one of those previously mentioned herein, results are obtained which are not obtainable by the use of either expander alone. For example, if the humic substance is used alone, both the capacity and the life of the negative pole plates are increased, particularly for low temperature service, but the increased capacity does not extend over the desired number of cycles of operation. On the other hand, if one of the ordinary expanders is used alone, the negative pole plates do not have the desired capacity particularly for low temperature service. However, when the humic substance and one of the other expanders are both employed, the plates have the desired life and capacity especially for low temperature service, and the increased capacity continues substantially throughout the life of the battery, this being a result which has never been attained before.

Having thus described my invention, I claim:

1. A lead compound for plates of storage batteries of the lead-acid type having distributed therethrough a humic substance and a sulphate of an alkaline earth metal.

2. A lead compound for plates of storage batteries of the lead-acid type having two expanders distributed therethrough one consisting of a humic substance in an amount from substantially 0.1% to substantially 1% by weight and the other consisting of a sulphate of an alkaline earth metal.

3. A lead compound for plates of storage batteries of the lead-acid type having two expanders substantially uniformly distributed throughout the same, one consisting of a humic substance and the other a sulphate of an alkaline earth metal in an amount from substantially 0.1% to substantially 1% by weight.

4. A lead compound for plates of storage batteries of the lead-acid type having distributed therethrough a humic substance and a sulphate of an alkaline earth metal each in an amount from substantially 0.1% to substantially 1% by weight.

5. A lead compound for plates of storage batteries of the lead-acid type having uniformly distributed therethrough two expanders one consisting of a humic substance composed chiefly of humic acid and the other consisting of a sulphate of an alkaline earth metal.

6. A lead compound for plates of storage batteries of the lead-acid type having distributed therethrough in finely divided form a humic substance and the sulphate of an alkaline earth metal.

7. A lead compound for plates of storage batteries of the lead-acid type having distributed therethrough in finely divided form a humic substance composed chiefly of humic acid in an amount from substantially 0.1% to substantially 1% by weight and the sulphate of an alkaline earth metal.

WILLARD L. REINHARDT.